United States Patent
Hirano et al.

(10) Patent No.: US 7,831,085 B2
(45) Date of Patent: Nov. 9, 2010

(54) METHOD OF MANUFACTURING PHOTO MASK, MASK PATTERN SHAPE EVALUATION APPARATUS, METHOD OF JUDGING PHOTO MASK DEFECT CORRECTED PORTION, PHOTO MASK DEFECT CORRECTED PORTION JUDGMENT APPARATUS, AND METHOD OF MANUFACTURING A SEMICONDUCTOR DEVICE

(75) Inventors: Takashi Hirano, Kawasaki (JP); Eiji Yamanaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 12/252,915

(22) Filed: Oct. 16, 2008

(65) Prior Publication Data

US 2009/0087081 A1    Apr. 2, 2009

Related U.S. Application Data

(62) Division of application No. 11/110,915, filed on Apr. 21, 2005, now Pat. No. 7,454,051.

(30) Foreign Application Priority Data

Apr. 22, 2004  (JP)  ............................. 2004-126795

(51) Int. Cl.
*G06K 9/00* (2006.01)
(52) U.S. Cl. ..................... 382/144; 382/145; 382/147; 382/149
(58) Field of Classification Search ................. 382/144, 382/145, 147, 149
See application file for complete search history.

(56) References Cited

U.S. PATENT DOCUMENTS 6,272,236 B1    8/2001    Pierrat et al.

(Continued)

FOREIGN PATENT DOCUMENTS

| JP | 8-87103 | 4/1996 |
|---|---|---|
| JP | 9-297109 | 11/1997 |
| JP | 2000-122265 | 4/2000 |

(Continued)

OTHER PUBLICATIONS

Office Action issued on Mar. 26, 2010 by Japan Patent Office in corresponding Japanese Application No. JP 2004-126795 (2 pages).

*Primary Examiner*—John B Strege
(74) *Attorney, Agent, or Firm*—Finnegan, Henderson, Farabow, Garrett & Dunner, L.L.P.

(57) ABSTRACT

According to an aspect of the invention, there is provided a method comprising detecting a defect of a pattern formed on the photo mask, acquiring a pattern image of a first region on the photo mask, extracting a pattern contour from the pattern image to acquire pattern contour extracted data, producing first graphic data based on the pattern contour extracted data and a pixel size, acquiring pattern data including the first region and corresponding to a second region from design data, producing second graphic data from the pattern data, replacing the second graphic data with the first graphic data to produce third graphic data only in a region where the first graphic data is superimposed upon the second graphic data, producing transfer patterns of pattern shapes represented by the second and third graphic data, and comparing the transfer patterns to judge whether or not the defect needs to be corrected.

5 Claims, 10 Drawing Sheets

U.S. PATENT DOCUMENTS

| | | |
|---|---|---|
| 6,757,645 B2 | 6/2004 | Chang et al. |
| 7,177,478 B2 | 6/2005 | Ye et al. |
| 7,155,699 B2 | 12/2006 | Cobb |

FOREIGN PATENT DOCUMENTS

| | | |
|---|---|---|
| JP | 2000-182921 | 6/2000 |
| JP | 2002-14459 | 1/2002 |
| JP | 2002-323749 | 11/2002 |
| JP | 2004-37579 | 2/2004 |

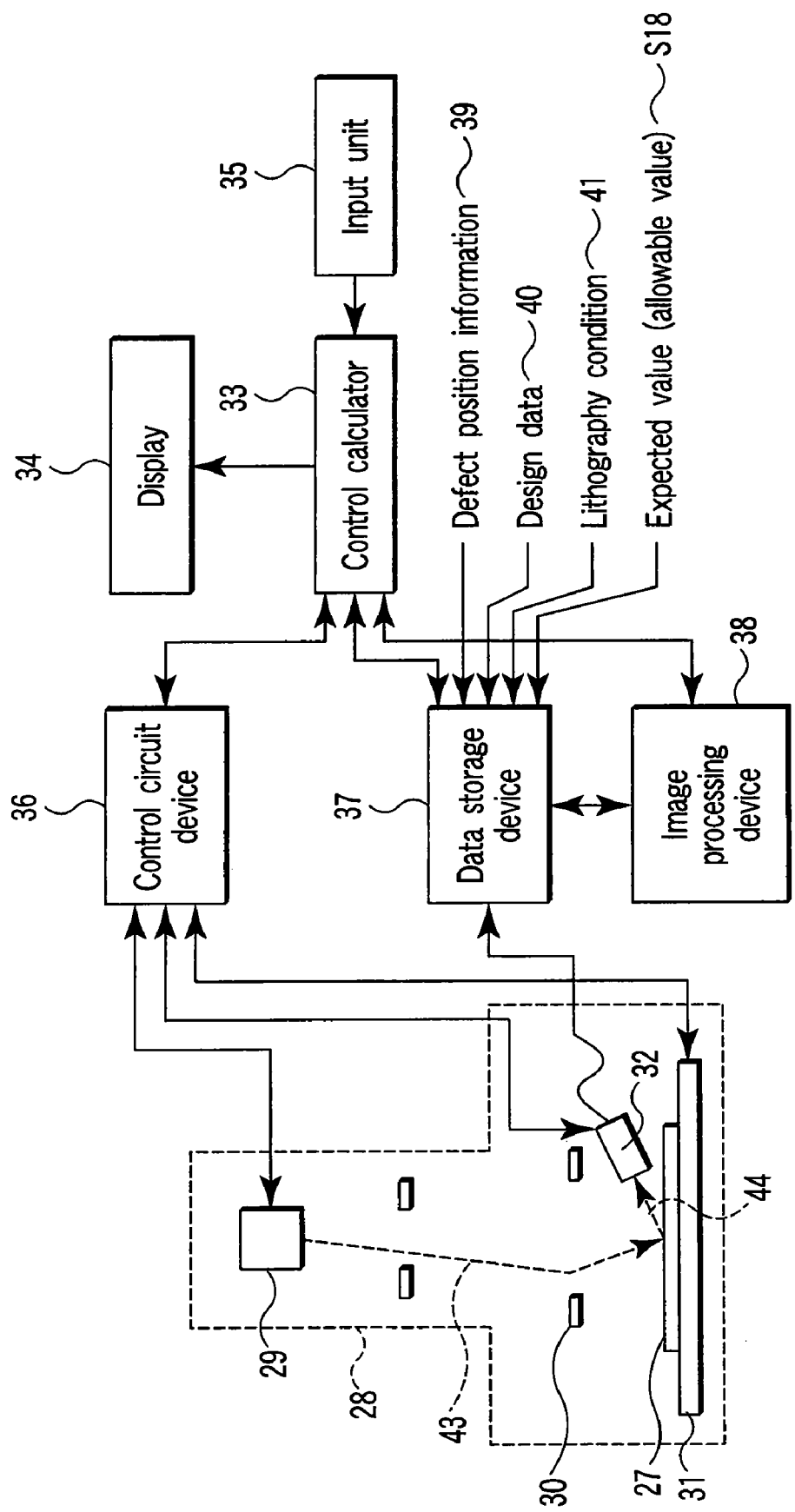
F I G. 3

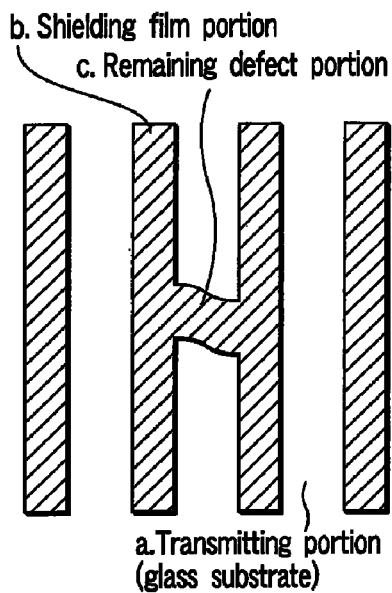
F I G. 4
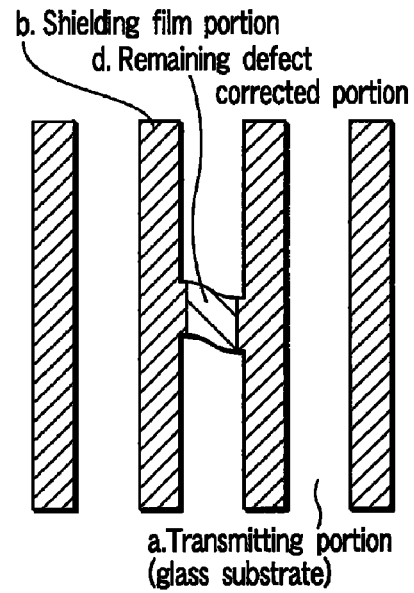
F I G. 5
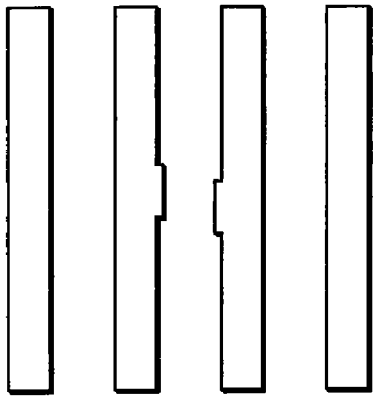
F I G. 6
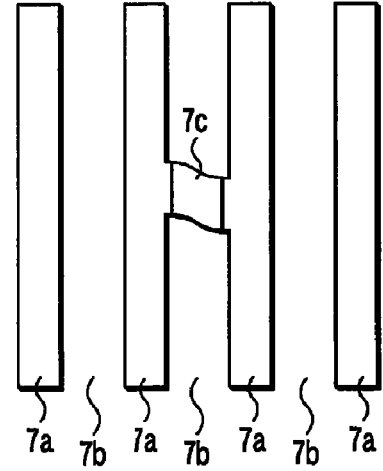
F I G. 7
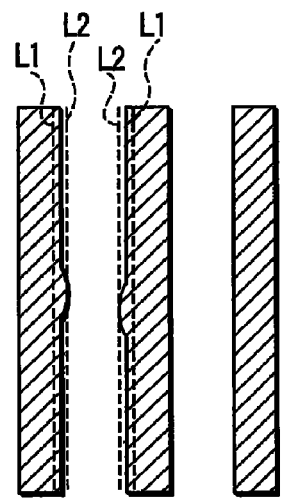
F I G. 8

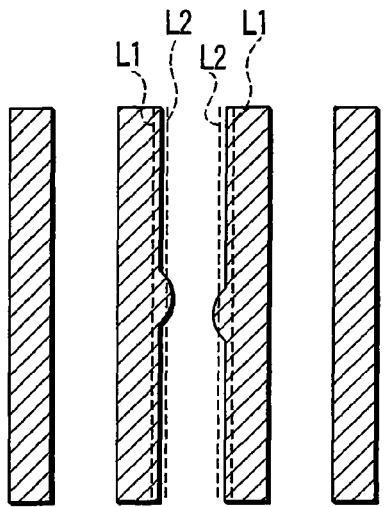
F I G. 9
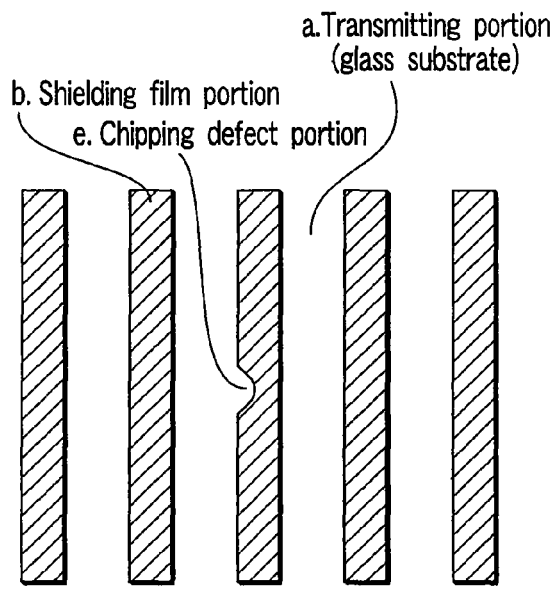
F I G. 10
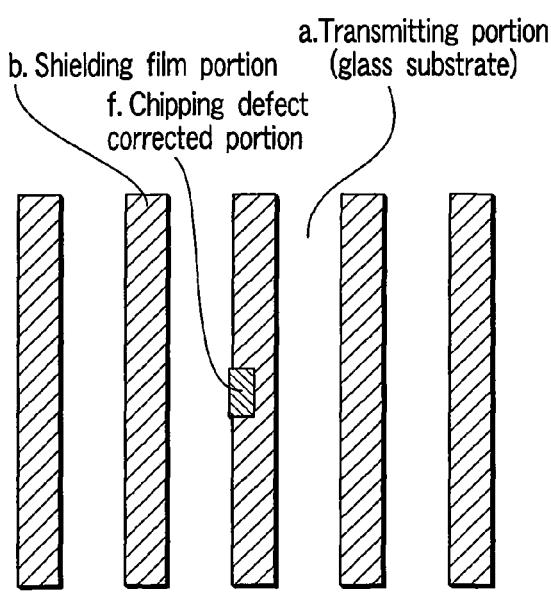
F I G. 11
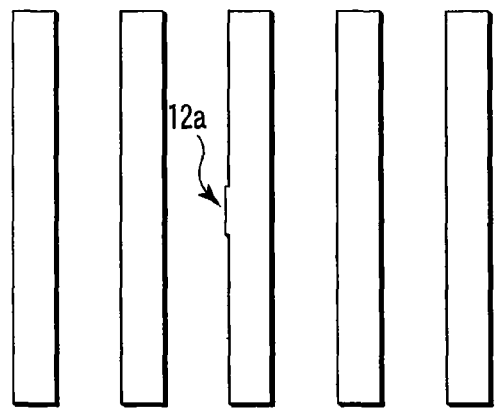
F I G. 12

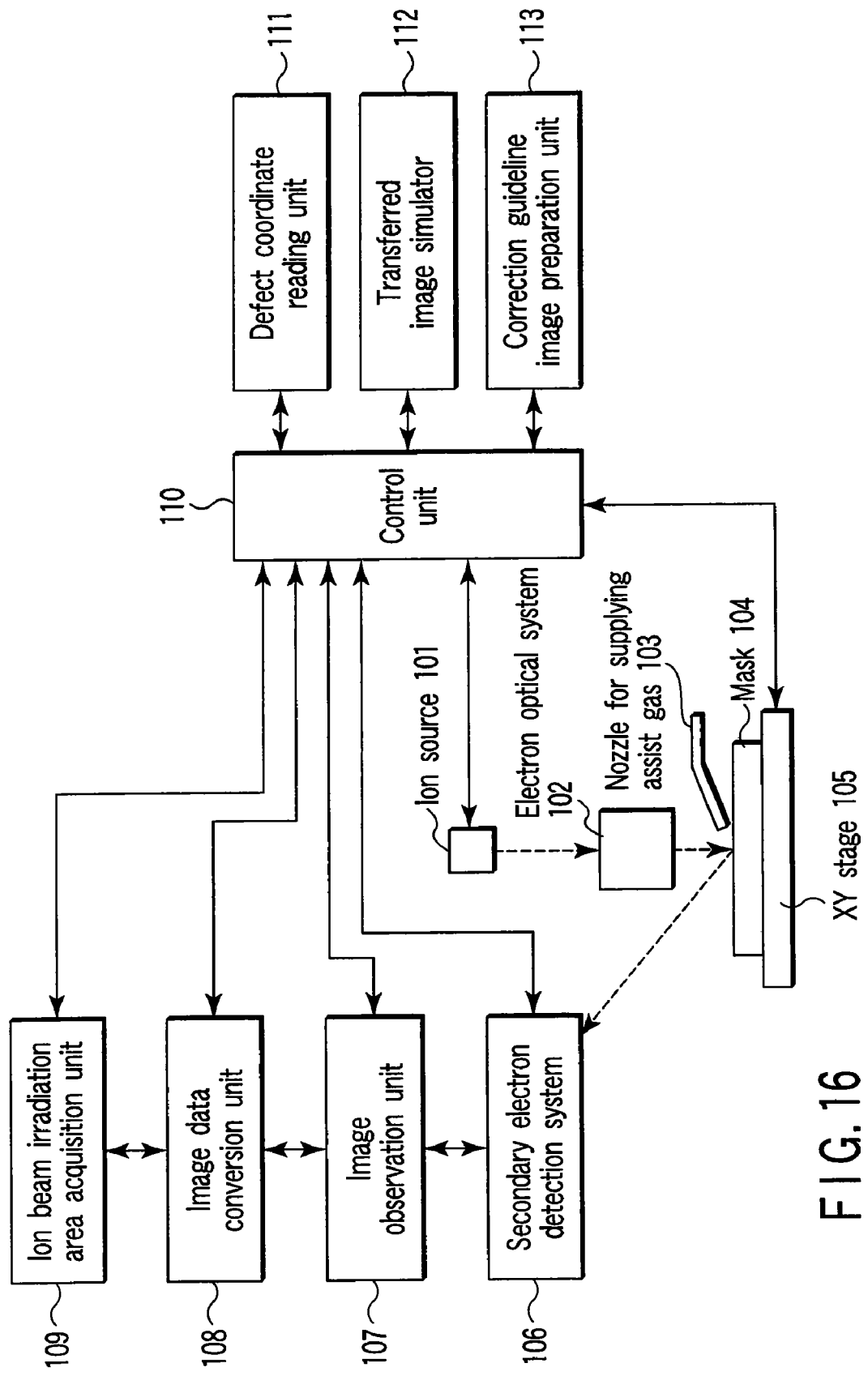
F I G. 16

METHOD OF MANUFACTURING PHOTO MASK, MASK PATTERN SHAPE EVALUATION APPARATUS, METHOD OF JUDGING PHOTO MASK DEFECT CORRECTED PORTION, PHOTO MASK DEFECT CORRECTED PORTION JUDGMENT APPARATUS, AND METHOD OF MANUFACTURING A SEMICONDUCTOR DEVICE

CROSS-REFERENCE TO RELATED APPLICATIONS

This is a division of application Ser. No. 11/110,915, filed Apr. 21, 2005, now U.S. Pat. No. 7,454,051 and claims the benefit of Japan Application No. 2004-126795, filed Apr. 22, 2004, both of which are incorporated herein by reference.

This application is based upon and claims the benefit of priority from prior Japanese Patent Application No. 2004-126795, filed Apr. 22, 2004, the entire contents of which are incorporated herein by reference.

BACKGROUND OF THE INVENTION

1. Field of the Invention

The present invention relates to a method of manufacturing a photo mask, a mask pattern shape evaluation apparatus, a method of judging a photo mask defect corrected portion, a photo mask defect corrected portion judgment apparatus, and a method of manufacturing a semiconductor device.

2. Description of the Related Art

As one cause for a yield drop in manufacturing a large-scaled integrated circuit (LSI), a pattern on a photo mask does not have a desired shape, for use in manufacturing a device by a photolithography technique. There is a so-called defect. Therefore, to manufacture the photo mask, an allowable value is determined beforehand as a specification with respect to a magnitude of the defect. In a step of inspecting the presence of the defect, it is confirmed that there is not any defect having a size which is not less than the value.

In recent years, as miniaturization of a design rule of LSI has advanced, precision required for the photo mask has been rapidly enhanced. For example, a specification value concerning the size of the defect has a level below 0.1 μm. However, the size of the defect determined by the specification value is generally defined assuming a severest condition, when estimating an influence degree in a photolithography step during the transferring onto the wafer, or an influence degree in operating the device.

Therefore, among defects detected in a step of inspecting the presence of the defect, some of them do not raise any problem in actually transferring the pattern onto the wafer. When the pattern on the photo mask including a defect portion is transferred onto the wafer, a shape of the formed pattern falls in an allowable range with respect to the desired shape in a case where the defects do not cause any problem.

Therefore, a method has been developed in which the influence degree is estimated by simulation at a time when the defect detected on the photo mask is transferred to the wafer, and it is judged whether or not the defect has such a size that causes the problem. Accordingly, the necessity of correcting the defect is judged.

Examples of input information during the simulation include an optical image of a defect inspection device for a photo mask, a secondary electron image, an atomic force microscope (AFM) image and the like. When a representation unit of two-dimensional data is considered, only stepwise information is obtained by a finite unit with respect to any image (hereinafter, this representation unit will be referred to as pixel resolution). For example, in the secondary electron image, the pixel resolution comprises a minimum unit determined by magnification of an optical electron system and size of a secondary electron detector.

When estimating the influence degree at the time when the defect on the photo mask is transferred onto the wafer by the simulation, input information preferably has a unit as small as possible. In recent years, by progress of miniaturization, it has been difficult to obtain a pattern intended by a designer on the wafer, when drawing the pattern shape on the photo mask in a simple rectangular figure by photolithography. To solve the problem, the pattern on the photo mask is corrected in such a manner as to finely change, so that the pattern on the wafer has a desired shape in many cases. Therefore, the pattern on the photo mask has many micro stepped portions or micro figures, and a part of the pattern is changed by a unit of 1 nm in some case.

On the other hand, when the influence degree is estimated at the time when the pattern on the photo mask is transferred onto the wafer by the simulation, a certain degree of broadness of the region is required. This is because light passed through a certain point on the photo mask reaches the wafer with a certain range of spread by diffraction phenomenon by a pattern edge. Calculation of the influence from the periphery requires not only the pattern shape of the region whose influence degree is to be estimated but also the pattern shape of the peripheral region. The required range of the peripheral region differs with the shape of the pattern, density, or condition in transferring the pattern onto the wafer, but is considered in a range of 16 μm at maximum on the photo mask.

That is, a combination is supposed to be required in which an image of a 16 μm region be acquired with a pixel resolution of about 1 nm. Considering the present situation of the device for acquiring the image, the number of pixels per side of an image is obtained as follows in a case where the image region acquired at the pixel resolution of 1 nm is 16 μm:

16×1000/1=16000.

There has not existed a device capable of acquiring an image having a large number of pixels in the present situation.

From this situation, in a conventional technique, in general, since a region obtained as the image is small, the same pattern is repeatedly generated around the pattern of the range obtained as the image, and a broad region is obtained in a pseudo manner to perform the simulation.

This technique is effective in a region in which patterns regularly continue. However, in a region where there is not regularity, a difference is made between estimated result and actual influence. Alternatively, even in the region where the patterns regularly continue, a difference is made between the pattern in performing the simulation and the actual pattern in an end portion. Therefore, there has been a problem that a difference is made between the estimated result and the actual influence. This difference cannot be ignored in a case where, in steps of manufacturing the photo mask, the influence degree is estimated at the time when the defect on the photo mask is transferred onto the wafer by simulation, and it is judged whether or not the defect needs to be corrected.

FIGS. 18A, 18B, 18C are diagrams of patterns input into simulation in a conventional technique, FIG. 18A is a diagram schematically showing a pattern including a defect on the photo mask, FIG. 18B is a diagram showing a pattern extracted from an image obtained by photographing the vicinity of the defect of FIG. 18A, and FIG. 18C is a diagram showing a pattern input into the simulation, produced by repeatedly arranging the pattern of FIG. 18B.

In FIGS. 18A, 18B, 18C, 1a denotes a transmitting region on the photo mask, 1b denotes a transmitting region in contour extraction data from an image, 2a denotes a shielding region on the photo mask, 2b denotes a shielding region in the contour extraction data from the image, 3a denotes a defect portion on the photo mask, 3b denotes a defect portion in the contour extraction data from the image, 4 denotes a pattern image acquisition region on the photo mask, 5 denotes a required region of simulation input data, and 6 denotes a boundary of pattern repetition.

It is assumed that, as shown in FIG. 18A, the pattern on the photo mask to be simulated is an end portion of a cell pattern of a semiconductor device, the region 4 obtained as the image is smaller than the region 5 required for the simulation, and there is an only pattern in a range in which regularity is held in the obtained image as shown in FIG. 18B. In this case, as shown in FIG. 18C, the pattern to be input into the simulation is prepared in a conventional method for repeatedly producing the pattern data obtained from the image. The pattern is largely different from the pattern on the actual photo mask shown in FIG. 18A, and an error is made in the result obtained by the simulation.

Moreover, similar methods of manufacturing the photo mask are described in Jpn. Pat. Appln. KOKAI Publication Nos. 9-297109, 2000-122265, and 2000-182921.

Furthermore, in the steps of manufacturing the photo mask, the defect on the photo mask detected by a defect inspection apparatus has heretofore been corrected by a defect correction apparatus. The defect portion is usually guaranteed by a microscope AIMS having a light source having a wavelength equal to that of a scanner, and an optical system (NA, σ, illumination condition).

FIG. 19 is a schematic diagram showing a configuration of the AIMS which is an AIMS for a KrF scanner. In this AIMS, first a σ and various illumination aperture 203, and an NA adjustment mechanism 206 are adjusted on exposure conditions for use in the actual scanner. Next, only light having a KrF wavelength (248 nm) is taken out from light emitted from a mercury lamp in a lamp house 201 using an interference filter 202. This light passes through the σ and various illumination aperture 203, and enters a photo mask to be inspected, laid on an XY stage 204.

The light passed through the photo mask to be inspected passes an objective lens 205 and the NA adjustment mechanism 206, and enters a CCD camera 207 for taking in an image. The same light intensity distribution as that transferred onto the wafer is obtained on a light receiving face of the CCD camera 207 for taking in the image, and the light intensity distribution is AD-converted. An image transferred onto the wafer can be obtained by the photo mask to be inspected on the XY stage 204.

From the image transferred onto the wafer, obtained by the AIMS, it is judged whether a defect corrected portion passes/fails on the photo mask to be inspected. In general, it is judged whether the portion passes/fails by judging whether or not the dimension of the corrected portion is within an allowable range with respect to a targeted dimension. It is judged whether the portion passes/fails by judging whether a ratio of the dimension of the corrected portion is not more than a predetermined value with respect to the dimension of a normal portion.

However, in this judgment method, it is necessary to modify the AIMS or introduce a new AIMS simultaneously with the progress of the scanner. For example, when a scanner is released having high NA or new illumination conditions, it is necessary to modify the AIMS accordingly. At present, a mainstream of the scanner is a scanner having a KrF or ArF light source. However, when the scanner of an F2 light source is applied to a product, it is necessary to newly develop and introduce an AIMS having the F2 light source. In the steps of manufacturing the photo mask, a step of guaranteeing the corrected portion is required. It is considered that delay of a mask TAT, and rise of mask cost are also caused.

Moreover, this type of method of correcting the defect is described in Jpn. Pat. Appln. KOKAI Publication No. 2002-14459, and 2002-323749.

BRIEF SUMMARY OF THE INVENTION

According to an aspect of the invention, there is provided a method of manufacturing a photo mask, comprising: detecting a defect of a pattern formed on the photo mask; acquiring a pattern image of a first region on the photo mask including the defect; extracting a pattern contour from the acquired pattern image to acquire pattern contour extracted data; producing first graphic data based on the pattern contour extracted data and a pixel size on the photo mask; acquiring pattern data including the first region and corresponding to a second region from design data of the photo mask; producing second graphic data from the acquired pattern data; replacing the second graphic data with the first graphic data to produce third graphic data only in a region where the first graphic data is superimposed upon the second graphic data; producing transfer patterns of pattern shapes represented by the second and third graphic data; and comparing the transfer patterns to judge whether or not the defect needs to be corrected.

According to another aspect of the invention, there is provided a mask pattern shape evaluation apparatus comprising: a first acquisition section which acquires a pattern image of a first region on a photo mask including a defect of a pattern; an extraction section which extracts a pattern contour from the acquired pattern image to acquire pattern contour extracted data; a first production section which produces first graphic data based on the pattern contour extracted data and a pixel size on the photo mask; a second acquisition section which acquires pattern data including the first region and corresponding to a second region from design data of the photo mask; a second production section which produces second graphic data from the acquired pattern data; a replacement section which replaces the second graphic data with the first graphic data to produce third graphic data only in a region where the first graphic data is superimposed upon the second graphic data; a third production section which produces transfer patterns of pattern shapes represented by the second and third graphic data; and a comparison section which compares the transfer patterns to judge whether or not the defect needs to be corrected.

According to another aspect of the invention, there is provided a method of judging a photo mask defect corrected portion, comprising: obtaining contour data of a photo mask whose defect has been corrected; obtaining information of a corrected region of the photo mask irradiated with a beam at the time of defect correction; synthesizing the contour data provided with information of transmittance and phase with information of the corrected region, provided with information of transmittance and phase change amount, to obtain a transferred image onto a substrate; and judging whether the corrected portion of the photo mask passes/fails from the image transferred onto the substrate.

According to another aspect of the invention, there is provided a photo mask defect corrected portion judgment apparatus comprising: a first obtainment section which obtains contour data of a photo mask whose defect has been corrected; a second obtainment section which obtains information of a corrected region of the photo mask irradiated with a beam at the time of defect correction; a synthesis section which synthesizes the contour data provided with information of transmittance and phase with information of the corrected region, provided with information of transmittance and phase change amount, to obtain a transferred image onto a substrate; and a judgment section which judges whether the corrected portion of the photo mask passes/fails from the image transferred onto the substrate.

BRIEF DESCRIPTION OF THE SEVERAL VIEWS OF THE DRAWING

FIG. 3 is a block diagram showing a constitution of a mask pattern shape evaluation apparatus and input information according to a second embodiment;

FIG. 4 is a diagram showing an example of a photo mask image photographed with an optical microscope according to a third embodiment;

FIG. 5 is a diagram showing an example of a photo mask image photographed with an optical microscope according to the third embodiment;

FIG. 6 is a diagram showing a contour image after mask defect correction according to the third embodiment;

FIG. 7 is a diagram showing data for wafer transferred image simulation according to the third embodiment;

FIG. 8 is a diagram showing a simulation result of an image transferred onto a wafer according to the third embodiment;

FIG. 9 is a diagram showing a simulation result of the image transferred onto the wafer according to the third embodiment;

FIG. 10 is a diagram showing an example of a photo mask image photographed with the optical microscope according to the third embodiment;

FIG. 11 is a diagram showing an example of the photo mask image photographed with the optical microscope according to the third embodiment;

FIG. 12 is a diagram showing a contour image after the mask defect correction according to the third embodiment;

FIG. 16 is a diagram showing a constitution of an FIB photo mask defect correction apparatus according to the third embodiment;

DETAILED DESCRIPTION OF THE INVENTION

Embodiments of the present invention will be described hereinafter with reference to the drawings.

A first embodiment will be described hereinafter in accordance with an example. In the example, when a defect is detected by a defect inspecting step of inspecting whether or not a desired shape has been obtained after forming a pattern on a photo mask in steps of manufacturing the photo mask, an influence degree on a transfer pattern is estimated by lithography simulation (litho•simulation) in a case where the pattern including the detected defect is transferred onto a wafer (semiconductor substrate). It is judged whether or not the defect has such a size that raises problems, and accordingly the necessity of correcting the defect is judged.

Figure 1A:
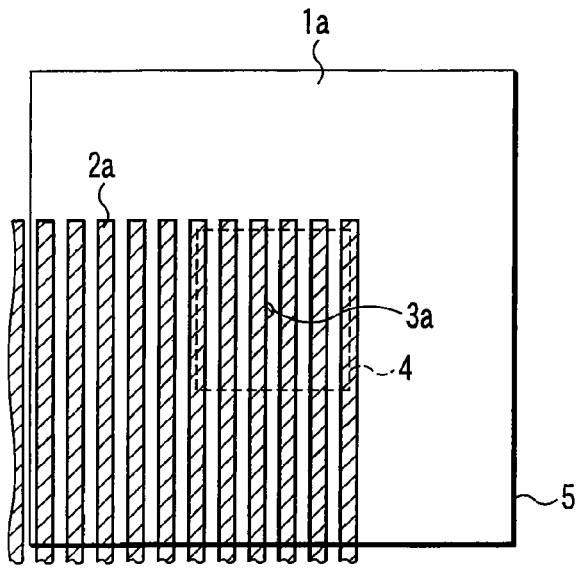
FIGS. 1A, 1B, 1C, 1D are diagrams showing patterns input into simulation in a first embodiment.
Figure 1B:
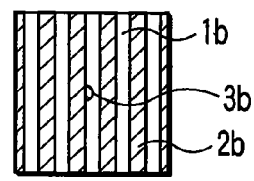
Figure 1C:
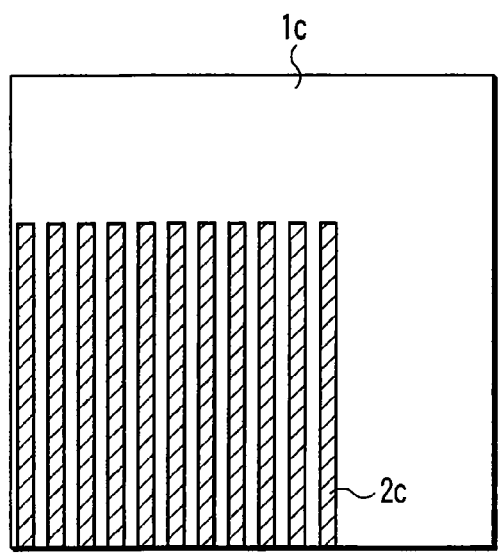
Figure 1D:
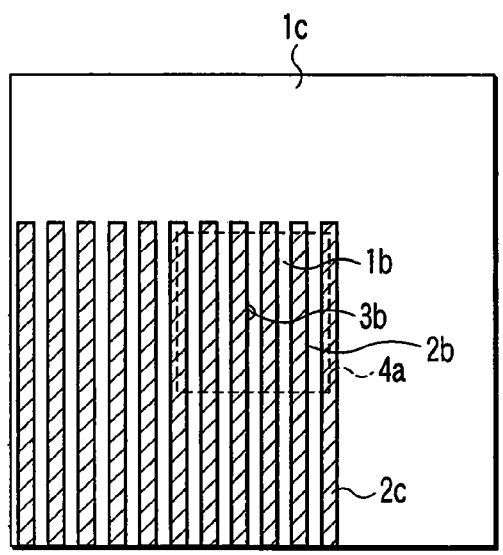

FIGS. 1A, 1B, 1C, 1D are diagrams showing patterns input into simulation in the first embodiment. FIG. 1A is a diagram schematically showing a pattern including a defect on the photo mask, FIG. 1B is a diagram showing a pattern extracted from an image obtained by photographing the vicinity of the defect of FIG. 1A, FIG. 1C is a diagram showing a pattern of design data of a region corresponding to FIG. 1A, and FIG. 1D is a diagram showing a pattern input into the simulation, produced by FIGS. 1B and 1C.

In FIGS. 1A, 1B, 1C, 1D, 1a denotes a transmitting region on the photo mask, 1b denotes a transmitting region in contour extraction data from an image, 1c denotes a transmitting region on CAD data, 2a denotes a shielding region on the photo mask, 2b denotes a shielding region in the contour extraction data from the image, 2c denotes a shielding region in the CAD data, 3a denotes a defect portion on the photo mask, 3b denotes a defect portion in the contour extraction data from the image, 4 denotes a pattern image acquisition region on the photo mask, 4a denotes a region corresponding to image acquisition in simulation input data, and 5 denotes a required region of simulation input data.

As shown in FIG. 1A, the photo mask has two types of pattern regions: a pattern 1a which transmits light in transferring the pattern to a wafer; and a pattern 2a having a certain degree of light blocking property. A defect 3a is detected which is a portion having a shape different from a desired shape by a defect inspecting step of inspecting whether or not this photo mask has a desired shape. Next, it is judged whether or not the defect 3a needs to be corrected.

Figure 2:
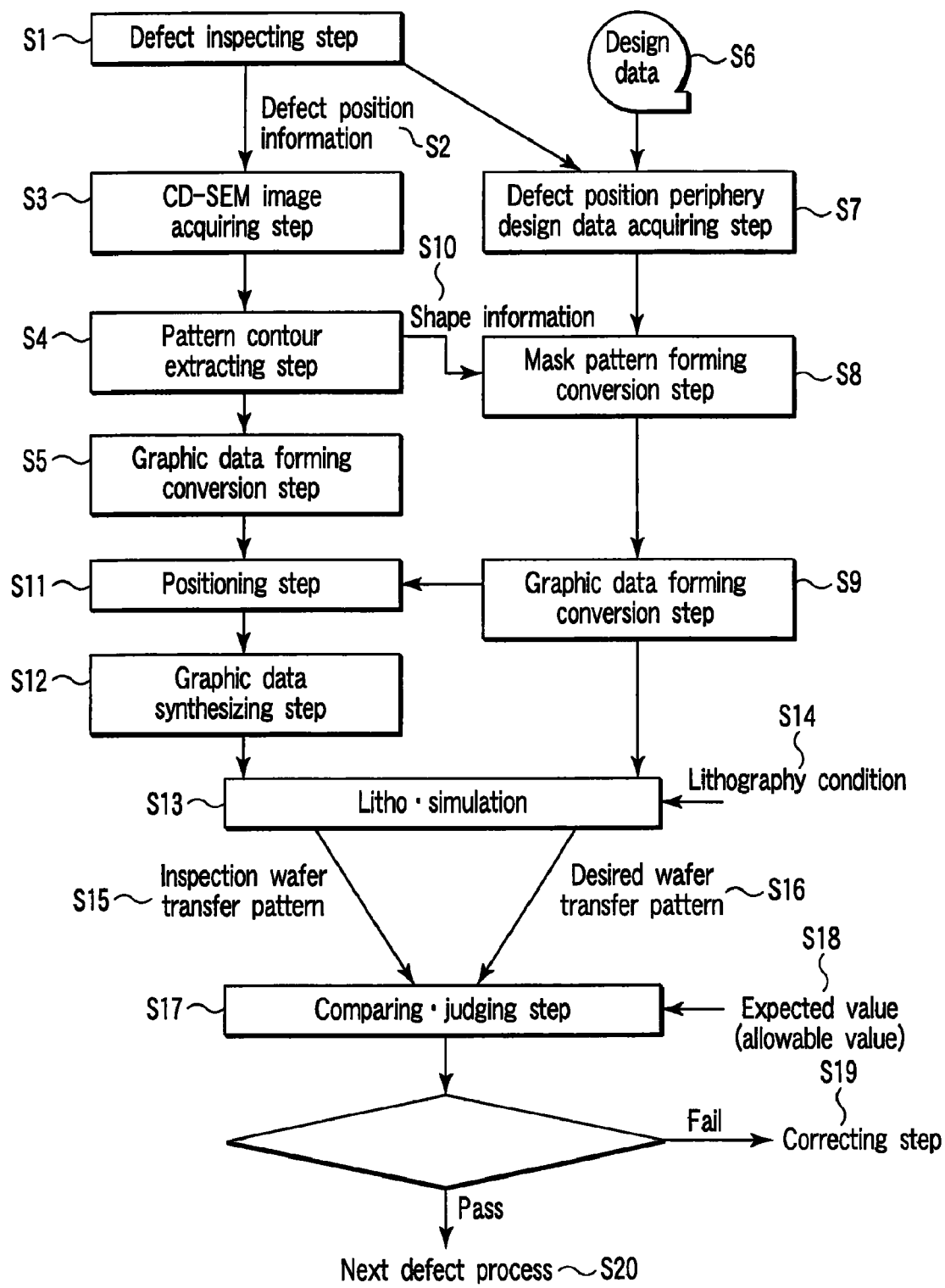
FIG. 2 is a flowchart showing a process procedure of the first embodiment.

FIG. 2 is a flowchart showing a process procedure of the first embodiment. A procedure will be described hereinafter which judges the necessity of correcting the defect with reference to FIG. 2.

First, in a large flow of the first embodiment, two data are produced: first graphic data indicating a pattern shape of a region including the defect 3a on an actual photo mask; and second graphic data indicating a desired pattern shape of a region including the defect 3a. A wafer transfer pattern is predicted from two graphic data by lithography simulation, and by comparison of results, the necessity of correcting the defect 3a is judged.

First, the first graphic data is produced indicating the pattern shape including the defect 3a detected by a defect inspecting step S1 on the photo mask. Next, in a CD-SEM image acquiring step S3, a pattern image in the vicinity of the defect 3a (first region) on the photo mask is acquired by a pixel unit from position information S2 of the defect 3a on the photo mask, output from the defect inspecting step S1, by a scanning electron microscope (or an atomic force microscope, a mask defect inspection device). To acquire this pattern image, it is necessary to obtain an image with a sufficiently high magnification in representing a fine stepped portion or roundness of the pattern shape. Pixel-unit pattern contour information is extracted from this pattern image to produce pattern contour extracted data by a pattern contour extracting step S4. Further in a graphic data forming conversion step S5, the pattern contour extracted data is multiplied by a size (pixel size) of the pixel constituting the pattern image, and is converted into an actual dimension unit. The data is converted into a graphic data form to be input into the simulation. The size of the pixel constituting the pattern image for use in this case is obtained beforehand as a calibration value using a pattern having a known size, in which a light transmitting pattern and a shielding pattern are repeatedly arranged. A pattern example of the graphic data produced in this manner is shown in FIG. 1B.

The first graphic data is produced indicating the pattern shape including the defect 3a on the photo mask in the above-described procedure. However, the graphic data in this state includes a problem in estimating influence on the transfer pattern when transferred onto the wafer by the simulation. When the photographing is performed with the sufficiently high magnification for representing the fine stepped portion or roundness of the pattern shape in the SEM image acquiring step S3, it is meant that the region represented in one image on the photo mask is limited to a small region. A required region has to have a sufficiently required size in view of the influence from the peripheral pattern shape in the lithography simulation. However, in the existing SEM device, it is generally impossible to satisfy both the high magnification and the sufficiently required size. To solve the problem, the procedure described later has to be followed.

Here, the description of the procedure for producing the first graphic data is interrupted, and a procedure for producing the second graphic data will be described. To produce the first graphic data of the photo mask indicating the desired pattern shape of the region (first region) including the defect 3a detected by the defect inspecting step S1, in a defect position periphery design data acquiring step S7, pattern data of a region (second region) on the photo mask is acquired further including the region (first region) including the defect 3a. The pattern data is acquired by design data S6 (design data by computer aid (CAD)) of the mask from database (not shown), and defect position information S2 of the defect 3a on the photo mask, output from the defect inspecting step S1. The region acquired here needs to be set to the sufficiently required size in view of the influence from the peripheral pattern shape in the lithography simulation.

Next, the pattern shape of the acquired pattern data is deformed in accordance with the actual mask pattern by a mask pattern forming conversion step S8. This process is required because even the mask pattern produced based on the design data slightly differs in shape by a manufacturing error generated at the time of the production of the mask. Examples of a deforming element include a pattern linear width, and roundness of a pattern angle. Shape information S10 of the mask pattern, indicating the degree of the deformation, is obtained from the pattern contour extracting step S4. Finally by a graphic data forming conversion step S9, the data is converted into a graphic data form to be input into the simulation to constitute the second graphic data. A pattern example of the graphic data produced in this manner is shown in FIG. 1C.

Next, a positioning step S11 will be described as continuation from the procedure for producing the first graphic data. First, the first graphic data (FIG. 1B) is superimposed upon a middle of the second graphic data (FIG. 1C), and displayed. The first graphic data indicates the pattern shape including the defect 3a on the photo mask, produced by the graphic data forming conversion step S5, whereas the second graphic data indicates the desired pattern shape of the region including the defect 3a, produced by the graphic data forming conversion step S9.

Here, it is described that the region of the first graphic data is smaller than that of the second graphic data. Moreover, each of two graphic data is produced based on the defect position information S2 output from the defect inspecting step S1. It is supposed that the data is influenced by stop position precision of a stage in acquiring an image in the SEM image acquiring step S3, and even a slight positional shift is caused. Therefore, to further precisely match two graphic data with a common position, position information of pattern edges in arbitrary positions is acquired. The information has the arbitrary number of (e.g., two) the arbitrary positions in a region common to the first and second graphic data. For example, two pieces of position information are acquired in a horizontal direction of the image, and a direction crossing the horizontal direction at right angles. The data are positioned in such a manner that two pieces of position information agree with each other.

Specifically, the pattern edges are selected in the arbitrary number of the arbitrary positions in the region common to the first and second graphic data. To minimize a difference between a distance from the pattern edge of the first graphic data to the pattern edge of the second graphic data in the horizontal direction and a distance from the pattern edge of the first graphic data to the pattern edge of the second graphic data in the direction crossing the horizontal direction at right angles, the positions of the first and second graphic data are adjusted in the horizontal direction and the direction crossing the horizontal direction at right angles. Alternatively, a pair of mutually juxtaposed pattern edges are selected in the arbitrary number of the arbitrary positions in the first graphic data. A difference is obtained between a distance between the selected pair of pattern edges, and a distance between a pair of pattern edges in the second graphic data, corresponding to the selected pair of pattern edges. Thickness of the pattern of the second graphic data is increased/decreased by this difference.

After this positioning step S11 is completed, in a graphic data synthesizing step S12, an only region common to the first graphic data in the second graphic data is replaced with information of the first graphic data. Accordingly, third graphic data to be input into the simulation is obtained. That is, the second graphic data is replaced with the first graphic data only in a region where the first graphic data is superimposed upon the second graphic data. FIG. 1D shows a pattern example of the third graphic data produced in this manner. It is seen that the graphic data having the same shape as that of FIG. 1A has been finally obtained indicating an original mask pattern shape.

Finally, the pattern shapes indicated by the third and second graphic data produced by the above-described procedure are processed into transfer patterns to be transferred onto the wafer by lithography simulation S13 in which lithography conditions S14 are given actually for use in a wafer transfer step. An inspection wafer transfer pattern S15, and a desired wafer transfer pattern S16 are produced.

Moreover, when the difference obtained by comparison of two transfer pattern shapes is larger than a predetermined expected value (allowable value) S18 in a comparing•judging step S17, it is judged that the defect 3a needs to be corrected, and the process advances to a correcting step S19. On the other hand, when the difference is not more than the expected value S18, it is judged that the defect 3a does not have to be corrected, and the process advances to a process S20 with respect to the next defect.

Moreover, in the comparing•judging step S17, it is judged whether or not the shape of the region is satisfactory, for example, with respect to a part of the transfer pattern S15 formed on the photo mask. Specifically, coordinate of the partial region on the photo mask is obtained beforehand. Lithography tolerance is estimated from the third graphic data by the simulation at a time when the partial region of the transfer pattern S15 is transferred onto the wafer by lithography conditions for use in this photo mask, and it is judged whether or not the shape of the partial region of the transfer pattern is satisfactory.

Finally, a semiconductor device is manufactured using the photo mask manufactured through the above-described steps of manufacturing the photo mask.

A mask pattern shape evaluation apparatus will be described hereinafter as a second embodiment. In the embodiment, when a defect is detected by a defect inspecting step of inspecting whether or not a desired shape has been obtained after forming a pattern on a photo mask in steps of manufacturing the photo mask, an influence degree on a transfer pattern is estimated by lithography simulation in a case where the pattern including the detected defect is transferred onto a wafer. It is judged whether or not the defect has such a size that raises problems, and accordingly the necessity of correcting the defect is judged in the apparatus.

FIG. 3 is a block diagram showing a configuration of the mask pattern shape evaluation apparatus and input information according to the second embodiment. The apparatus roughly comprises a scanning electron microscope (hereinafter referred to as the SEM) 28 which acquires a secondary electron image of the pattern on the photo mask; an electronic calculator for performing the control and various processes with respect to the acquired image; and an electronic circuit.

The SEM 28 comprises: an XY stage 31 on which a photo mask 27 is to be laid and which is capable of moving to an arbitrary position; an electron gun 29 which shoots electrons; an optical electron system 30 which controls an electron 43 shot from the electron gun 29 to guide the electron onto the photo mask 27; and a secondary electron detection device 32 for detecting a secondary electron 44 excited/discharged from the electron which has hit the photo mask 27. An operation of each device of the SEM 28 is controlled on receiving a control signal from a control calculator 33 via a control circuit device 36.

In the electronic calculator and the electronic circuit, there are the control circuit device 36 which controls the SEM 28, and the control calculator 33 which sends a control signal to the device. The control calculator 33 is connected to a data storage device 37 which stores various data, and an image processing device 38 which performs a part of a process only. The image processing device 38 is preferably disposed in order to speed up various processes. However, the process performed herein may be replaced in such a manner as to be executed by software in the control calculator 33, and the image processing device is not necessarily required. Furthermore, the control calculator 33 is connected to a display 34 which outputs information for an operator of the apparatus, and an input device 35 capable of inputting information from the operator of the apparatus.

A procedure will be described hereinafter with respect to a process to judge necessity of correcting the defect by the mask pattern shape evaluation apparatus.

A rough process flow of the second embodiment is the same as that of the first embodiment. Two data are produced: first graphic data indicating the pattern shape of the region including the defect on an actual photo mask; and second graphic data indicating a desired pattern shape of the region including the defect. A wafer transfer pattern is predicted from two graphic data by lithography simulation, and results are compared to judge the necessity of correcting the defect. Therefore, the procedure will be described hereinafter with respect to the respective steps of the first embodiment performed by this apparatus.

First, the production of the first graphic data will be described. The first graphic data indicates the pattern shape of the region including the defect on the actual photo mask. In this apparatus, the data is produced from the mask pattern acquired as an image by the SEM. Details will be described hereinafter.

First, the operator lays the photo mask 27, on the XY stage 31 of the SEM 28, in which the defect exists detected in the defect inspecting step (S1). Next, defect position information 39 is input, the control calculator 33 outputs a movement control signal to the XY stage 31 of the secondary electron microscope 28 via the control circuit device 36, and the defect on the photo mask is positioned in a middle of an image acquiring region.

Next, the control calculator 33 controls the optical electron system 30 via the control circuit device 36 to obtain a state in which an appropriate image is obtained. An appropriate state indicates a state in which the mask pattern shape can be correctly represented without any distortion or focal blur. Here, the control calculator 33 issues a command to the secondary electron detection device 32 via the control circuit device 36 in such a manner as to acquire a secondary electron image of the mask pattern. The SEM image acquired by the secondary electron detection device 32 is stored in the data storage device 37. Pattern information of the SEM image obtained in this manner is subjected to a process of extracting the pattern edge in the image processing device 38 to form the graphic data. The graphic data corresponds to data output from the graphic data forming conversion step (S5) in the first embodiment.

Moreover, as described in the first embodiment, in this stage, the graphic data is based on the SEM image obtained at such a high magnification that can represent a fine stepped portion of the mask pattern. Therefore, the data does not have information of a region having a sufficient size, when considering an influence by a peripheral pattern in lithography simulation. However, this problem is solved by the procedure described later.

Here, the description of the procedure for producing the first graphic data is discontinued, and a procedure for producing second graphic data will be described. It is assumed that design data 40 of the mask pattern is input beforehand. The control calculator 33 acquires the design data of the region including the defect based on the input of the defect position information 39 detected by the defect inspection. The region acquired here needs to be set to a sufficiently required size in view of the influence from the peripheral pattern shape in the lithography simulation.

Next, the control calculator 33 deforms the shape of the acquired pattern of the design data in accordance with the actual mask pattern by a mask pattern forming conversion step (S8). This process is required because even the mask pattern produced based on the design data slightly differs in shape by a manufacturing error generated at the time of manufacturing the mask. Examples of a deforming element include a pattern linear width, roundness of a pattern angle and the like. Information indicating the degree of the deformation is obtained from the SEM image in a pattern contour extracting step (S4). Finally, the image processing device 38 converts the data into a graphic data form to be input into the simulation to constitute the second graphic data by a graphic data forming conversion step (S9). FIG. 1C shows a pattern example of the graphic data produced in this manner.

Next, as continuation from the procedure for producing the first graphic data, as described in the first embodiment, the first graphic data (FIG. 1B) is replaced with a region common to the second graphic data (FIG. 1C), and synthesized. The first graphic data indicates the pattern shape including the defect on the photo mask, whereas the second graphic data indicates the desired pattern shape of the region including the defect.

In this process by the apparatus according to the second embodiment, first, the control calculator 33 first takes in the position information of the XY stage 31 via the control circuit device 36 to thereby specify the position of the first graphic data on the photo mask. The first graphic data is superimposed upon the second graphic data based on this position information. However, it is supposed that even a slight positional shift is caused under the influence of position reading precision of the XY stage 31. Therefore, as described in the first embodiment, precise positioning needs to be performed using position information of common pattern edges in mutual regions of the first and second graphic data. In the second embodiment, this is realized by a software process of the control calculator 33. By the above-described process, the first graphic data to be input into the simulation is completed. FIG. 1D shows a pattern example of the graphic data produced in this manner. It is seen that the graphic data having the same shape as that of FIG. 1A has been finally obtained indicating an original mask pattern shape.

Finally, with respect to the first and second graphic data produced by the above-described procedure, the lithography simulation is individually executed by the control calculator 33 using input information of a lithography condition 41 actually for use in a wafer transfer step. An inspection wafer transfer pattern (S15), and a desired wafer transfer pattern (S16) are produced, respectively. Moreover, when the difference obtained by comparison of two pattern shapes is larger than input information of a predetermined expected value (allowable value) (S18), it is judged by the control calculator 33 that the defect needs to be corrected, and the process advances to a correcting step (S19). On the other hand, when the difference is not more than the expected value S18, it is judged by the control calculator 33 that the defect does not have to be corrected, and the process advances to a process (S20) with respect to the next defect.

Finally, a semiconductor device is manufactured using the photo mask manufactured using the above-described mask pattern shape evaluation apparatus.

The embodiments of the present invention have been described above, but are not limited. For example, means for acquiring the image of the mask pattern does not have to be limited to the SEM device, various devices are considered such as an optical image observation device, an atomic force microscope (AFM), and a mask defect inspection device. A method of evaluating the mask pattern by the lithography simulation does not have to be limited to judgment by comparison of the mask pattern including the defect as in the above-described embodiments with the desired pattern from the design data. Another method is considered in which the only pattern information formed into the graphic data is lithography simulated from the image of the mask pattern to obtain the shape of the wafer transfer pattern or lithography tolerance.

Additionally, when the graphic data of the pattern is obtained from a high-resolution image, pattern information is not simultaneously obtained with respect to a required broad region. In this case, the pattern information is synthesized with the graphic data produced from the design data indicating the desired pattern, and is compensated, so that graphic data close to an actual pattern can be produced.

In the first and second embodiments, to judge whether or not the pattern shape on the photo mask is satisfactory by a result of prediction of a transfer pattern, by simulation, at a time when the pattern is transferred on the wafer on lithography conditions of the photo mask, the pattern on the photo mask is acquired as an image. Finally, graphic data representing the pattern on the actual photo mask is synthesized with the graphic data produced based on the design data of the photo mask. Accordingly, there is provided pattern data faithful to the pattern of the actual photo mask as input data for the simulation. Consequently, the pattern shape and the lithography tolerance can be precisely obtained at the time when the pattern of the photo mask is transmitted onto the wafer. It is possible to judge whether or not the pattern shape on the photo mask is satisfactory with high precision. That is, when the pattern around a defective region obtained as an image is more faithfully reproduced, precision can be enhanced in estimating influence degree at a time when the defect on the photo mask is transferred to the wafer by the simulation.

A procedure for judging whether a corrected portion passes/fails will be described with respect to a remaining defect detected by a photo mask defect inspection device, that is, a defect of an unnecessary shielding film left in a transmitting portion.

First, after the defect inspection ends in the photo mask defect inspection device, the photo mask is set in a photo mask defect correction device to be subjected to defect correction. The photo mask defect correction device is allowed to read a defect coordinate file detected by the photo mask defect inspection device. The photo mask defect correction device moves the photo mask to a first defect coordinate position based on the defect coordinate file read from the photo mask defect inspection device.

FIG. 4 is a diagram showing an example of a photo mask image photographed with an optical microscope, and shows a defect on the photo mask. In FIG. 4, a white portion shows a transmitting portion a (glass substrate). A slanted-line portion shows a shielding film portion b having a transmittance of 6% in light having a KrF wavelength, and a phase difference of 180 degrees from the transmitting portion a. That is, FIG. 4 shows an example there is a remaining defect portion c (defect of the unnecessary shielding film remaining in the transmitting portion) in a halftone mask for a KrF scanner.

FIG. 5 is a diagram showing an example of a photo mask image photographed with the optical microscope. The diagram shows an image obtained by correcting the remaining defect portion c shown in FIG. 4 in an FIB photo mask defect correction device using ion beams (e.g., Ga ion beams) and an assist gas. In FIG. 5, a coarse slanted-line portion shows a portion whose defect has been corrected using the ion beams and an etching gas, that is, a remaining defect corrected portion d from which the unnecessary shielding film has been removed. This indicates that the transmittance drops by implantation of Ga ions into the transmitting portion a (glass substrate) at the time of correction in the focused ion beam (FIB) photo mask defect correction device. Moreover, a phase difference or the like is generated by drilling of the transmitting portion a, and the transmittance drops as compared with a usual transmitting portion.

FIG. 6 is a diagram showing a contour image of the photo mask after the defect has been corrected. FIG. 6 shows an image indicating that the contour data is obtained from the secondary electron image of the photo mask from which the remaining defect has been removed by the FIB photo mask defect correction device as shown in FIG. 5. This contour data is obtained with the same threshold value as that used in measuring a dimension of the photo mask. As seen from FIG. 6, the contour data of the remaining defect corrected portion d cannot be obtained from which the remaining defect has been removed as shown in FIG. 5.

The contour data shown in FIG. 6 is used, parameters are input into the shielding film portion, including a transmittance of 6% and a phase of 180 degrees, and parameters are input into the transmitting portion, including a transmittance of 100% and a phase of 0 degree. Even when the transferred image of the wafer is simulated in this manner, a correct wafer transferred image cannot be simulated, because information is not reflected indicating the transmittance drop of the portion from which the remaining defect has been removed.

To solve the problem, information is obtained from the FIB photo mask defect correction device indicating a corrected region of the photo mask irradiated with the Ga ion beams at the time of defect correction, and contour data is obtained in order to simulate the transferred image onto the wafer as shown in FIG. 7. Here, the parameters are input into the shielding film portion of the contour data, including a transmittance of 6% and a phase of 180 degrees, and the parameters are input into the transmitting portion, including a transmittance of 100% and a phase of 0 degree. When the defect is corrected by the FIB photo mask defect correction device, the transmittance substantially constantly drops in the region irradiated with the Ga ion beam, or the phase substantially constantly changes. The transmittance or the change amount of the phase at the defect correction time are input as the parameters into the information of the corrected region of the photo mask irradiated with the Ga ion beam at the defect correction time. For example, a transmittance of 98% and a phase difference of −2 degrees are input as the parameters.

In the third embodiment, the transferred image onto the wafer is simulated using the contour data shown in FIG. 7 and the parameters of the transmittance and phase. That is, parameters of transmittance to patterns 7a, and phase are set to 6%, 180 degrees, respectively. The parameters of transmittance to patterns 7b, and phase are set to 100%, 0 degree, respectively. The parameters of transmittance to patterns 7c, and phase are set to 98%, −2 degrees, respectively. Furthermore, conditions (exposure wavelength, NA, σ, illumination conditions) are input for exposure of the wafer, and the transferred image onto the wafer is simulated.

FIG. 8 is a diagram showing a simulation result of the image transferred onto the wafer, obtained from the contour data of FIG. 6, and FIG. 9 is a diagram showing a simulation result of the image transferred onto the wafer, obtained from the contour data of FIG. 7.

Broken lines L1, L2 shown in FIGS. 8, 9 show ranges of dimensions allowed on the wafer, provided by a user of the photo mask. Usually in the range, ±10% or less is allowed with respect to a targeted dimension. When the obtained edge positions of the transferred image onto the wafer are between the broken lines L1 and L2, the defect corrected portion passes. If there is a portion protruding outside the broken lines L1, L2, the defect corrected portion fails, and is therefore corrected again. The photo mask is discarded.

FIG. 8 shows a result of the simulation of the transferred image onto the wafer from the contour data of FIG. 6 in which the transmittance and the phase change amount are not considered with respect to the defect corrected portion. Therefore, the defect corrected portion of the edge position is between the broken lines L1 and L2, and it is judged that the defect correction of the portion passes. On the other hand, FIG. 9 shows a result of the simulation of the transferred image onto the wafer from the contour data of FIG. 7 in which the transmittance and the phase change amount are considered with respect to the defect corrected portion. Since the defect corrected portion of the edge position protrudes out of the broken lines L1, L2, it is judged that the defect correction of the portion fails.

When the defect corrected portion exceeds the allowable range of the dimension as shown in FIG. 9, it can be judged that the remaining defect still remains, the remaining defect is removed again, and the image transferred onto the wafer is simulated again to thereby judge the pass/fail.

A procedure for judging whether the defect corrected portion passes/fails will be described. The procedure relates to a chipping defect detected by the photo mask defect inspection device, that is, the defect from which the required shielding film has chipped away.

First, after the defect inspection ends in the photo mask defect inspection device, the photo mask is set in the photo mask defect correction device to be subjected to defect correction. The photo mask defect correction device is allowed to read a defect coordinate file detected by the photo mask defect inspection device. The photo mask defect correction device moves the photo mask to a first defect coordinate position based on the defect coordinate file read from the photo mask defect inspection device.

FIG. 10 is a diagram showing an example of a photo mask image photographed with the optical microscope, and shows the defect on the photo mask. In FIG. 10, a white portion shows a transmitting portion a (glass substrate). A slanted-line portion shows a shielding film portion b having a transmittance of 6% in light having a KrF wavelength, and a phase difference of 180 degrees from the transmitting portion a. That is, FIG. 10 shows an example there is a chipping defect portion d (defect from which the required shielding film has chipped away) in a halftone mask for a KrF scanner.

FIG. 11 is a diagram showing an example of the photo mask image photographed with the optical microscope. FIG. 11 shows an image indicating that the chipping defect portion e shown in FIG. 10 is corrected by the FIB photo mask defect correction device using ion beams (e.g., Ga ion beams) and an assist gas (deposition gas). FIG. 11 shows a portion whose defect has been corrected, that is, a rectangular chipping defect corrected portion f shown by a fine slanted-line portion in a portion from which the required shielding film has chipped away. The corrected portion is a deposited film deposited using the ion beam and deposition gas by the FIB photo mask defect correction device. In general, a material of the film deposited using the ion beam and deposition gas is carbon, and film thickness of the deposited film is adjusted in such a manner that a value of transmittance is equal to that of the shielding film, but the phase of light transmitted through this deposited film cannot be changed.

FIG. 12 is a diagram showing an example of a contour image of the photo mask after the defect correction. FIG. 12 shows an image indicating that the contour data is obtained from the secondary electron image of the photo mask in which the deposited film has been deposited in the chipping defect portion by the FIB photo mask defect correction device as shown in FIG. 11. This contour data is obtained with the same threshold value as that used in measuring a dimension of the photo mask. In FIG. 12, the contour data of a deposited film portion 12a deposited in the chipping defect portion can be obtained. However, as described above, in general, the material of the deposited film deposited using the ion beam and deposition gas is carbon, and the film thickness of the deposited film is adjusted in such a manner that the transmittance is equal to that of a KrF halftone mask, but the phase of light transmitted through this deposited film cannot be changed. Therefore, in the deposited film portion deposited in the chipping defect portion, the values of the transmittance and the phase cannot be set to be equal to those of a normal portion.

Figure 13:
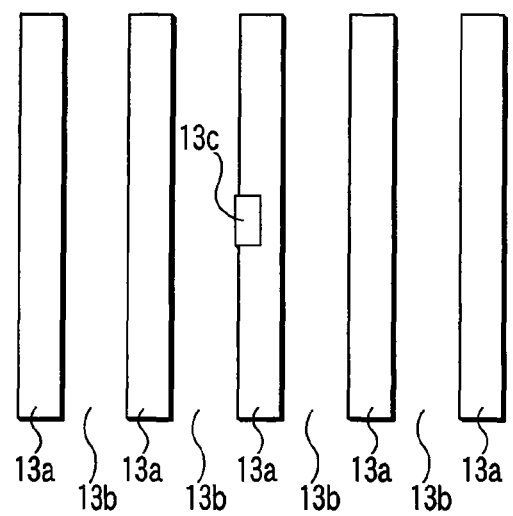
FIG. 13 is a diagram showing the data for the wafer transferred image simulation according to the third embodiment.

To solve the problem, information is obtained from the FIB photo mask defect correction device, indicating the corrected region irradiated with the Ga ion beam at the time when the chipping portion is corrected. The image transferred onto the wafer is simulated using the contour data shown in FIG. 13 and parameters of transmittance and phase. That is, parameters of transmittance to patterns 13a, and phase are set to 6%, 180 degrees, respectively. The parameters of transmittance to patterns 13b, and phase are set to 100%, 0 degree, respectively. The parameters of transmittance to patterns 13c, and phase are set to 6%, 0 degree, respectively. Furthermore, conditions (exposure wavelength, NA, σ, illumination conditions) are input for exposure of the wafer, and the transferred image onto the wafer is simulated.

Figure 14:
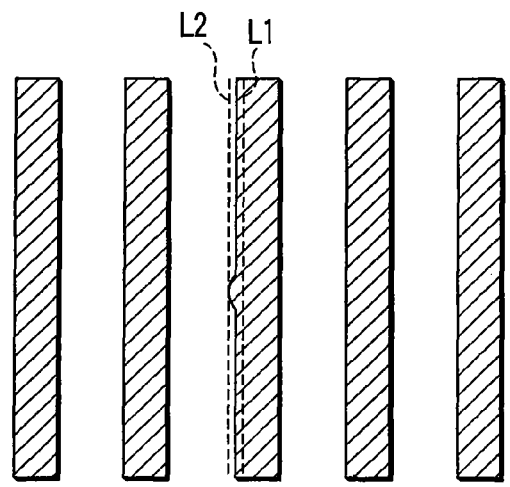
FIG. 14 is a diagram showing a simulation result of the image transferred onto the wafer according to the third embodiment.
Figure 15:
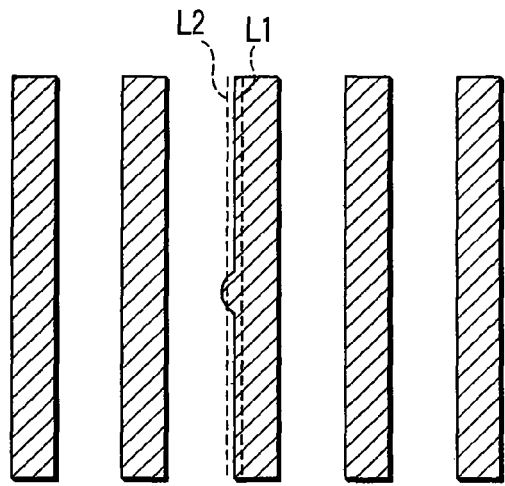
FIG. 15 is a diagram showing a simulation result of the image transferred onto the wafer according to the third embodiment.

FIG. 14 is a diagram showing a simulation result of the image transferred onto the wafer, obtained from the contour data of FIG. 12, and FIG. 15 is a diagram showing a simulation result of the image transferred onto the wafer, obtained from the contour data.

Broken lines L1, L2 shown in FIGS. 14, 15 show ranges of dimensions allowed on the wafer, provided by a user of the photo mask. Usually in the range, ±10% or less is allowed with respect to a targeted dimension. When the obtained edge positions of the transferred image onto the wafer are between the broken lines L1 and L2, the defect corrected portion passes. If there is a portion protruding outside the broken lines L1, L2, the defect corrected portion fails, and is therefore corrected again. The photo mask is discarded.

FIG. 14 shows a result of the simulation of the transferred image onto the wafer from the contour data of FIG. 12 in which the transmittance and the phase change amount are not considered with respect to the deposited film. Therefore, the defect corrected portion of the edge position is between the broken lines L1 and L2, and it is judged that the defect correction of the portion passes. On the other hand, FIG. 15 shows a result of the simulation of the transferred image onto the wafer from the contour data of FIG. 13 in which the transmittance and the phase change amount are considered with respect to the deposited film. Since the defect corrected portion of the edge position protrudes out of the broken lines L1, L2, it is judged that the defect correction of the portion fails.

Finally, a semiconductor device is manufactured using a photo mask which is judged to pass in the above-described photo mask defect corrected portion judging method.

FIG. 16 is a diagram showing a configuration of the FIB photo mask defect correction apparatus according to the third embodiment. A defect coordinate reading unit 111 reads a defect coordinate file detected by the defect inspection device. A control unit 110 moves an XY stage 105 to a first defect coordinate position based on the defect coordinate file read by the defect coordinate reading unit 111. The control unit 110 performs the following defect correction based on an image indicating a correction guideline prepared by a correction guideline image preparation unit 113.

An ion beam emitted from an ion source 101 is condensed on a mask 104 disposed on the XY stage 105 by an optical electron system 102, a secondary electron generated from the mask 104 is received by a secondary electron detection system 106, and a signal is sent to an image observation unit 107 to obtain a defect image of the mask 104. The control unit 110 supplies a gas to a defect portion of the mask 104 displayed in an image observation unit 107 from an assist gas supplying nozzle 103, and the defect portion is irradiated with an ion beam emitted from the ion source 101 and passed through the optical electron system 102 to correct a first defect.

Next, after correcting the first defect, a mask image (secondary electron image) is obtained by the image observation unit 107 via the secondary electron detection system 106. The mask image obtained by the image observation unit 107 is converted into contour data by an image data conversion unit 108. An ion beam irradiated area acquisition unit 109 acquires position and region information of an area of the mask 104 irradiated with the ion beam from the control unit 110 at the time of the correction of the first defect. This information is sent to the image data conversion unit 108, and synthesized with the contour data of the mask image (secondary electron image) obtained by the image observation unit 107. The values of transmittance and phase of a shielding film portion, transmitting portion, and defect corrected portion are set, and data for transferred image simulation is prepared.

The data for the transferred image simulation is sent to a transferred image simulator 112 from the image data conversion unit 108 via the control unit 110. In the transferred image simulator 112, lithography conditions (exposure wavelength, NA, σ, illumination conditions) are input which are wafer transfer conditions, and a transfer simulation image onto the wafer is obtained. In the control unit 110, when the dimension of a corrected portion of the photo mask falls in an allowable range in the transfer simulation image onto the wafer, obtained by the transferred image simulator 112, it is judged that the corrected portion passes, and the XY stage 105 is moved to a second defect coordinate position.

Finally, a semiconductor device is manufactured using a photo mask which is judged to pass in the above-described photo mask defect correction device.

Figure 17:
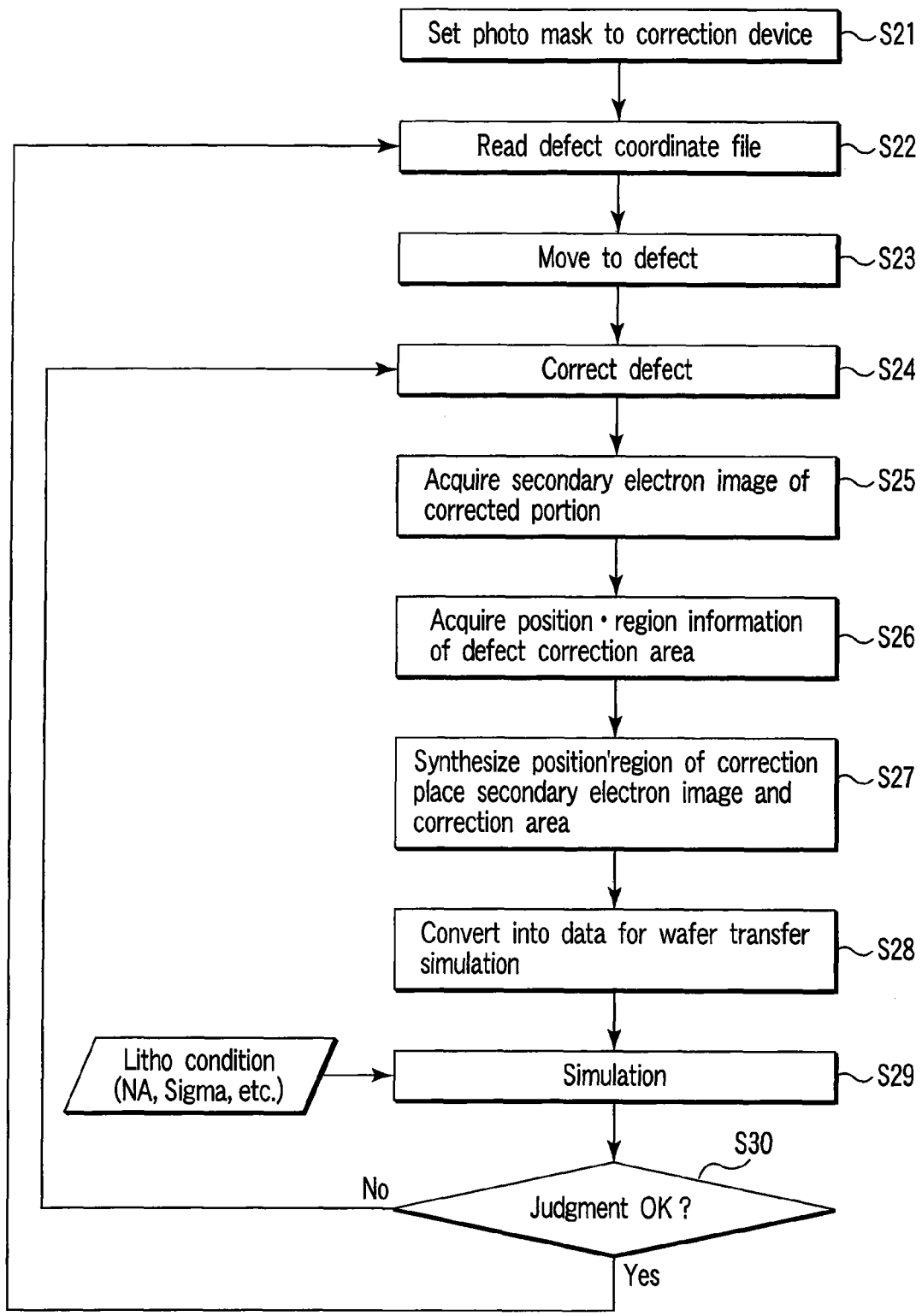
FIG. 17 is a flowchart showing a procedure of a method of guaranteeing a defect corrected portion according to the third embodiment.
Figure 18A:
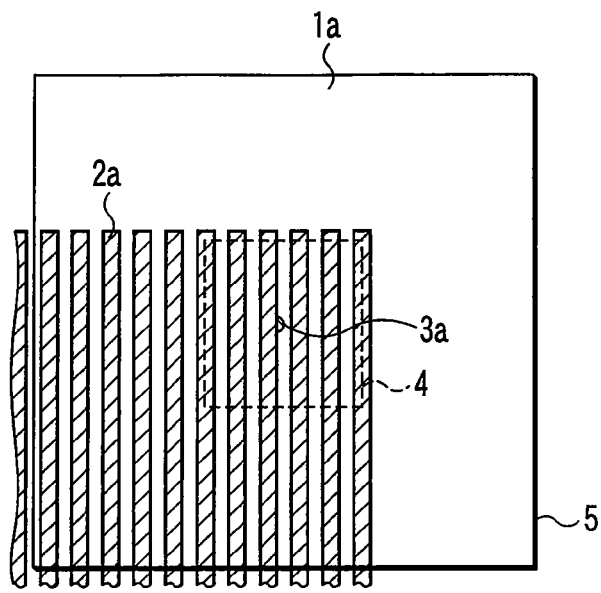
FIGS. 18A, 18B, 18C are diagrams of patterns input into simulation in a conventional example.
Figure 18B:
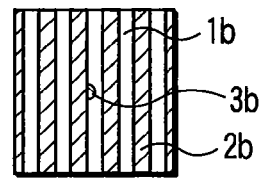
Figure 18C:
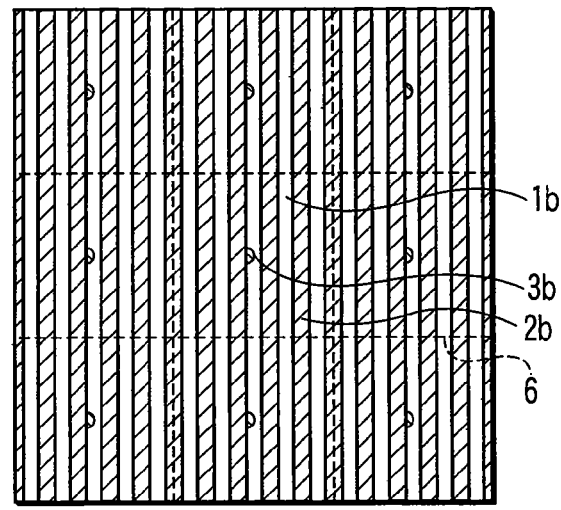
Figure 19:
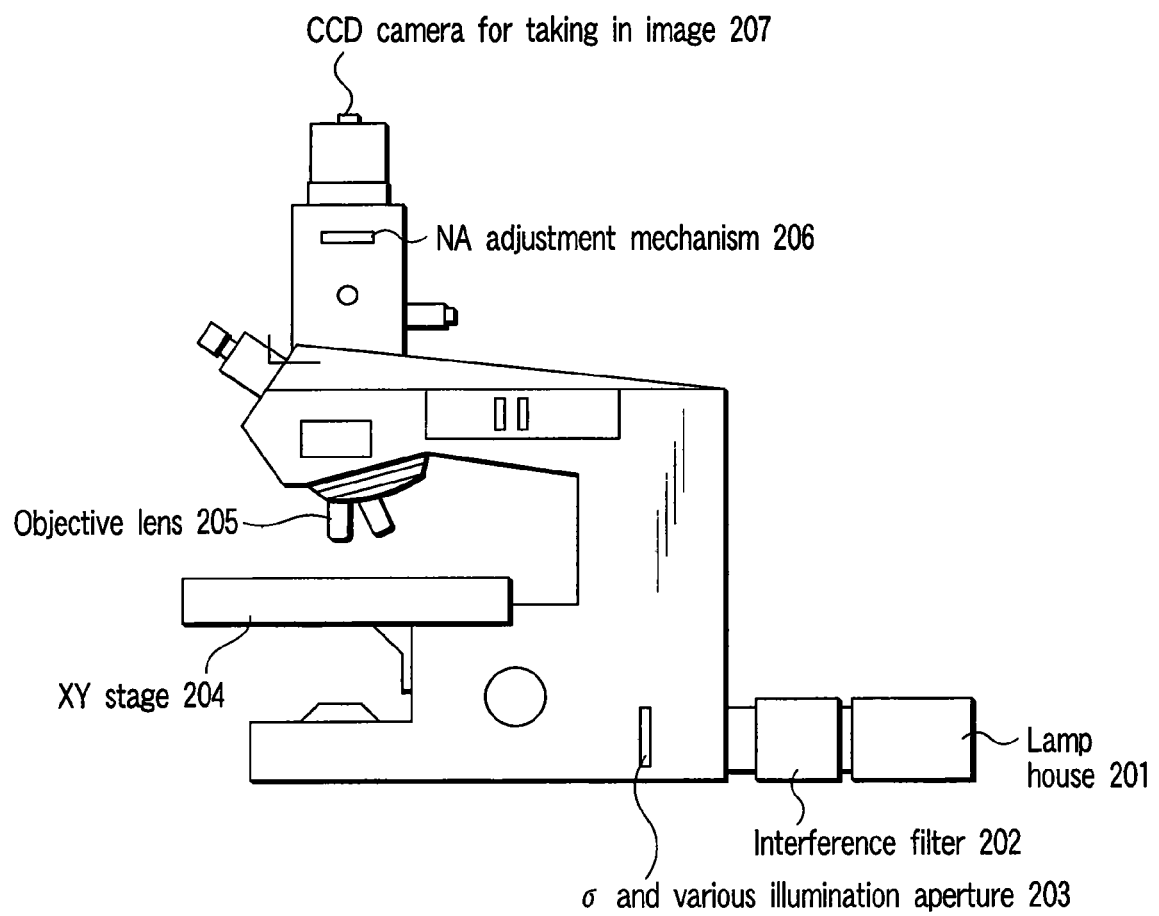
FIG. 19 is a schematic diagram showing a constitution of AIMS according to the conventional example.

FIG. 17 is a flowchart showing a procedure of a method of guaranteeing a defect corrected portion according to the third embodiment. A procedure for guaranteeing the defect corrected portion will be described with reference to FIG. 17.

First, in step S21, an operator sets the photo mask in the FIB photo mask defect correction device. In step S22, the defect coordinate reading unit 111 reads an inspection result file of the photo mask set in the defect correction device, that is, a file in which a defect coordinate is described from the defect inspection device. In step S23, the control unit 110 moves the XY stage 105 on which the photo mask 104 is set to a defect coordinate position based on this defect coordinate file.

Next, in step S24, the control unit 110 corrects the defect. In step S25, the image observation unit 107 acquires the secondary electron image of the defect corrected position. In step S26, the ion beam irradiated area acquisition unit 109 acquires position and region information of a peripheral defect corrected area including the defect corrected portion. In step S27, the image data conversion unit 108 synthesizes a secondary electron image of the defect corrected portion acquired in step S25 with the position and region information of the defect corrected area acquired in the step S26. In step S28, the image data conversion unit 108 converts the information into data for transferred image simulation. At this time, the values of transmittance and phase of the shielding film portion, transmitting portion, and defect corrected portion are set.

In step S29, the transferred image simulator 112 obtains a transfer simulation image onto the wafer using the data for the transferred image simulation and lithography conditions (exposure wavelength, NA, σ, illumination conditions) which are conditions in transferring the image onto the wafer. In step S30, the control unit 110 evaluates whether or not the dimension of the defect corrected portion falls in an allowable range in the obtained transfer simulation image onto the wafer. When the dimension is within the allowable range, it is judged that defect correction passes. To correct the next defect, the process returns to the step S22. When the dimension deviates from the allowable range, it is judged that the defect correction fails, and the process returns to the step S24 in order to perform re-correction.

In the third embodiment, the defect is detected by the photo mask defect inspection device, and corrected by the photo mask defect correction device. The contour data is obtained from the secondary electron image of the photo mask subjected to the defect correction, and it is judged whether the corrected portion passes/fails using the image transferred onto the wafer, obtained from the contour data by the simulation. Furthermore, after imparting, to the contour data, changes of the transmittance and phase of the defect corrected portion, generated in correcting the defect in the photo mask defect correction device, the image transferred onto the wafer is simulated. It is judged from the image whether the corrected portion passes/fails. The defect corrected portion of the photo mask has heretofore been guaranteed using a microscope having a light source having a waveform equal to that of an exposure device onto the wafer, such as AIMS, or the same type of optical system (NA, σ, illumination condition). On the other hand, in the present embodiment, the image transferred onto the wafer is simulated using the image obtained by synthesizing the contour data of the photo mask subjected to the defect correction with the corrected region, Consequently, simple and quick guarantee can be realized as compared with a conventional method using the AIMS.

According to the embodiments of the present invention, there can be provided a method of manufacturing the photo mask, and a mask pattern shape evaluation apparatus in which precision is enhanced in estimating an influence degree at a time when the defect on the photo mask is transferred onto a substrate.

Moreover, according to the embodiments of the present invention, there can be provided a photo mask defect corrected portion judging method and a photo mask defect corrected portion judgment apparatus in which the defect corrected portion on the photo mask is easily and quickly judged.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A method of judging a photo mask defect corrected portion, comprising:
   obtaining contour data of a photo mask whose defect has been corrected;
   obtaining information of a corrected region of the photo mask irradiated with a beam at the time of defect correction;
   synthesizing the contour data with information of the corrected region to obtain a transferred image onto a substrate, the contour data being provided with information of transmittance and phase and the information of the corrected region being provided with information of transmittance and phase change amount; and
   judging whether the corrected portion of the photo mask passes/fails from the image transferred onto the substrate.

2. The method of judging the photo mask defect corrected portion according to claim 1, wherein the defect is a remaining defect or a chipping defect.

3. The method of judging the photo mask defect corrected portion according to claim 1, wherein it is judging whether or not the corrected portion passes/fails by judging whether or not an edge position of the corrected portion in the image transferred onto the substrate is within a preset range.

4. A photo mask defect corrected portion judgment apparatus comprising:
   a first obtainment section which obtains contour data of a photo mask whose defect has been corrected;
   a second obtainment section which obtains information of a corrected region of the photo mask irradiated with a beam at the time of defect correction;
   a synthesis section which synthesizes the contour data with information of the corrected region to obtain a transferred image onto a substrate, the contour data being provided with information of transmittance and phase and the information of the corrected region being provided with information of transmittance and phase change amount; and
   a judgment section which judges whether the corrected portion of the photo mask passes/fails from the image transferred onto the substrate.

5. A method of manufacturing a semiconductor device using the photo mask which has been judged to pass by the method of judging the photo mask defect corrected portion according to claim 1.

* * * * *